United States Patent [19]

Kato

[11] 4,086,970
[45] May 2, 1978

[54] VIBRATION ABSORBING DEVICE FOR PORTABLE VIBRATORS

[75] Inventor: Hiroshi Kato, Ashikaga, Japan

[73] Assignee: Sakura Denki Kabushiki Kaisha, Japan

[21] Appl. No.: 751,436

[22] Filed: Dec. 16, 1976

[30] Foreign Application Priority Data

Apr. 23, 1976  Japan .................................. 51-45328

[51] Int. Cl.² .............................................. E21B 3/00
[52] U.S. Cl. ..................................... 173/162; 267/158
[58] Field of Search ................ 173/162, 139; 267/137, 267/158; 248/15, 18

[56] References Cited

U.S. PATENT DOCUMENTS

| 1,293,251 | 2/1919 | Troeger ................................ 173/162 |
| 1,431,808 | 10/1922 | Jackson ................................ 173/162 |
| 3,652,074 | 3/1972 | Frederickson et al. .............. 173/162 |

FOREIGN PATENT DOCUMENTS

| 948,564 | 1/1949 | France .................................. 173/162 |
| 2,330,533 | 1/1975 | Germany ............................ 267/158 |

*Primary Examiner*—Robert A. Hafer
*Attorney, Agent, or Firm*—Flynn & Frishauf

[57] ABSTRACT

A vibration absorbing device comprising a plurality of corrugated resilient bars joined together to form a cylindrical basket connecting a machine body including a power source and a handle for operating the machine. The said vibration absorbing device when incorporated in such portable vibrator machines of which use accompanies vibration as concrete vibrators or chain saws will help the operator to avoid undesirable effects of vibration on his health and will effectively prevent damage to the machine body, particularly to the part joining the power cable, etc.

5 Claims, 3 Drawing Figures

VIBRATION ABSORBING DEVICE FOR PORTABLE VIBRATORS

BACKGROUND OF THE INVENTION

The present invention relates to a vibration absorbing device provided between the machine body incorporating a vibration source and the handle in such portable machines as, for example concrete vibrators, chain saws, concrete breakers, rivet guns or belt sanders.

In the prior art are known vibrators which try to impart fluidity to raw or uncured concrete which had been poured into a mold so as to fill its corners by inserting a stick like vibrator into the concrete and transmitting vibration to the uncured concrete. There are two types of such vibrators known; one attaches an unbalanced weight to the shaft of a small size motor, houses the shaft in a sleeve casing, and revolves the eccentric shaft at a high speed; the other houses an unbalanced weighted shaft alone in the casing and a rotational movement from an outside source is transmitted to the said shaft via a hose housing a flexible shaft joined to the rear end of the casing.

The effective radius of these known types of concrete vibrators becomes bigger proportionate to the slump of concrete and to the accelerated speed of vibration. This accelerated vibration naturally varies in proportion to the second power of the speed of rotation of the shaft and in proportion to the amplitude of vibration. Thus, the effective range of vibration is said to increase validly in accordance with a higher speed of rotation. A generally used range is 7,000 – 10,000 rpm for the vibrational number and 1 – 3 mm for amplitude. Many of the type of concrete vibrators described above are small size, one-man operated portable machines with a total weight not exceeding 20 kg. Even a very large type machine would require only two operators and is portable. This type of vibrator has as a source of vibration either an electric motor incorporated within the machine body or an outside power source such as an internal combustion engine joined to the eccentrically load shaft encased in the main body via a flexible shaft. The vibrator is joined to an outside power source such as a portable generator or to an outside prime mover either with a cable for supplying the current or for controlling such a supply, or with a flexible hose through which is inserted the said flexible shaft. In other cases a hose coupling is attached directly to the machine body of the vibrator and joined to the said flexible hose. In both cases, the vibration of the machine body causes premature fatigue and damage to the portion where the hose coupling is joined to the flexible hose, and also exerts undesireable effects on the health of operators as they are directly subjected to the vibration.

In comparatively big sized concrete vibrators, the machine is so constructed that the machine body including the source of vibration has a support means attached thereto via yielding rubber, a hose coupling to connect the operating bar handle and the said flexible hose, and a cable for passing the current or a flexible shaft inserted through the said support means and the said yielding rubber and into the machine body. As has been mentioned above, the said yielding rubber directly receives the vibration from the machine body which results in an early fatigue and requires frequent replacement of the rubber. All of these disadvantageous effects bring about added costs and labor in maintenance.

Various difficulties explained above are encountered in machines other than concrete vibrators, i.e., rock drills, drills, rivet guns, chain saws, and lead to such occupational disease as chain saw disease. Although various vibration absorbing means to cut off vibration transmission to operators of these vibrator machines of the portable type have heretofore been proposed, there has not yet been proposed a means which sufficiently supports the weight of the machine and the reaction force during operation and at the same time effectively attenuates the vibration imparted to the operator.

SUMMARY OF THE INVENTION

An object of the present invention is to provide a vibration absorbing mechanism which will decrease the material fatigue caused by vibration, and also will effectively attenuate the vibration transmission from the machine body to the flexible hose and to the operator.

Another object of the invention is to provide a vibration absorbing mechanism which will effectively attenuate the above mentioned vibration and which has a sufficient strength to support the machine body.

Still another object of the invention is to provide a vibration absorbing device which may be incorporated easily in a conventional portable machine and which will securely support the vibrating machine body by its handle and effectively shut off the vibration transmission.

The vibration absorbing device in accordance with the present invention comprises a vibration absorbing joint attached between the handle and the machine body which incorporates a vibration source of such portable machines as portable concrete vibrators, rock drills, drills, rivet guns and chain saws, all of which accompany vibration during use. This improved vibration absorbing joint consists of a plurality of resilient bars such as small diameter round or rectangular steel bars joined together to form a cylindrical basket. Each bar is corrugated with at least one ridge on a plane including radial and axial directions of the said basket and fixed to the top and bottom ring members at both ends thereof. Accordingly, by fixing these top and bottom ring members of the joint respectively to the machine body and to the handle, the machine body and the handle are joined to each other by the cylindrical basket joint. Thus, when it is necessary to join the machine body to the handle by a power cable or a flexible shaft as in the cases explained above, the flexible hose encasing such a power cable or flexible shaft may be inserted through the basket joint via inner bores of the top and bottom ring members.

In the vibration absorbing device in accordance with the present invention, each bar comprising the cylinder basket of the vibration absorbing joint is corrugated with at least one ridge, and as such ridges are arranged radially in the direction of radius away from the joint axis, the vibration is effectively absorbed in all the directions three dimensionally at the cylindrical basket instead of being transmitted from the machine body to the handle. By joining the handle and the machine body with such a cylindrical basket shaped joint mechanism, the basket joint acts to enhance the strength as the operator holds the handle to support the machine body via the vibration absorbing joint.

The vibration absorbing efficiency and holding strength of the above described joint may be determined arbitrarily by selecting the material, thickness and number of bars as well as the amplitude and dimension of the corrugation in accordance with the specification.

The objects and effectiveness of the present invention described above as well as those not mentioned will become apparent from the following description taken in conjunction with the attached drawings illustrating an embodiment of the present invention.

DESCRIPTION OF PREFERRED EMBODIMENT

Embodiments shown in the attached drawing are all as applied to portable concrete vibrators encasing a motor therein. As already mentioned, the vibration absorbing device of this invention may be applied to various types of portable vibrating machines such as a chain saw or a rock drill, and acts to radically reduce the vibration transmission to the handle from the machine body which has the source of vibration incorporated therein.

Figure 1:
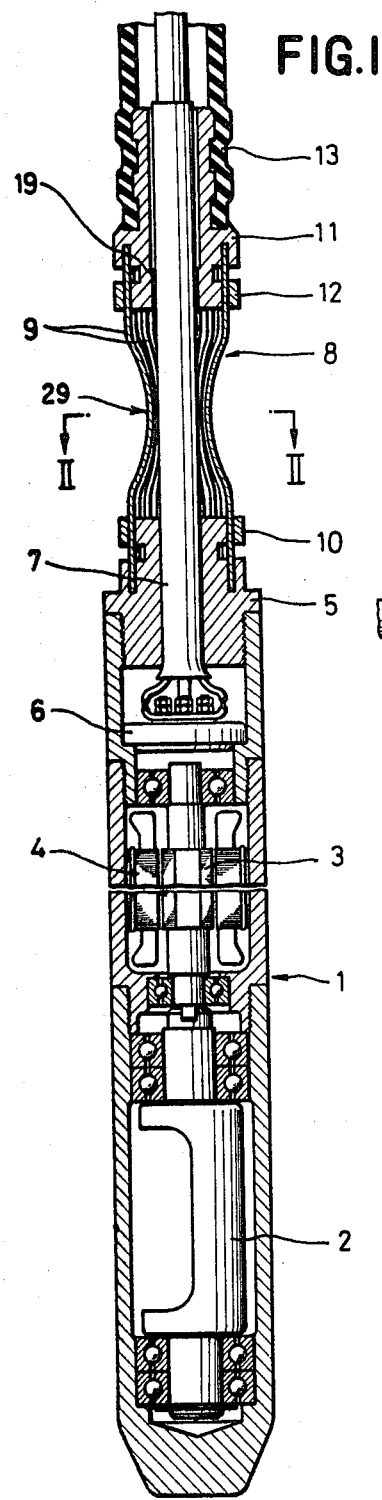
FIG. 1 shows a vertical cross section of one embodiment of the present invention as applied to a concrete vibrator.
Figure 2:
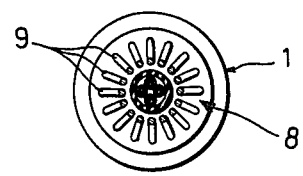
FIG. 2 is a cross section along the line II—II seen in the direction of the arrows.

FIGS. 1 and 2 show the machine body 1 of a vibrator encasing an electric motor, and comprising an unbalanced weight 2 positioned at its lower end a stator 4 and a rotor 3 joined directly to the weight 2. Within the top cover 5 is arranged a terminal assembly 6 for applying electric power to the motor with the cable 7 joined to each of the terminals. A vibration absorbing joint 8, which comprises the main part of the present invention, comprises a plurality of elastic or resilient bars 9 forming a cylindrical basket, each bar 9 being corrugated with at least one ridge 29 on a plane including the directions of the radius and of the axis of the cylindrical basket. In other words, each of bars 9 is equally spaced apart on the periphery of the basket so that their ridges would be arranged radially as shown in FIG. 2, and thus the profile of a plurality of the bars 9 joined together will become a corrugated cylindrical basket.

One end of each of the bars 9 is fixed by welding or the like to the top cover 5 and at the other end to a ring member 12. A hose coupling 11 has a through hole 19 for letting the cable 7 pass therethrough and is joined to a flexible hose 13 to allow the cable 7 to pass therethrough and be protected. The flexible hose 13 leads to an outside source of power not shown in the drawings. The bars 9 are designed in such a way that the diameter and number of the bars are determined in advance to achieve enough mechanical strength to cope with the force of vibration of the machine body 1 and the reaction force as the machine is inserted into concrete. Further, circular or rectangular bars of desired material such as spring steel are bent with a predetermined curvature depending on the properties of the vibrator in order that they may function as a vibration absorbing joint of a cylindrical basket shape.

In the embodiment just explained, an operator manipulates the vibrator by holding the machine in the vicinity of the hose coupling 11. Almost all the vibrations of a vibrator occur in the direction of the radius and they are absorbed as the respective bars 9 function as a vibration absorbing body with their resiliency in the said direction of radius. Thus, the cylindrical basket of bars 9 arranged radially as shown in FIG. 2 will function as a vibration absorbing body in all the directions of radius, i.e., 360°.

In a vibrating machine equipped with a vibration absorbing joint of the present invention, the vibration which would otherwise have been transmitted to the hose coupling handle 11 from the machine body is, accordingly, attenuated sufficiently. Neither the operator who is holding the handle 11 nor the flexible hose 13 would be subjected to any violent repeated vibrations so that chances of discomfort to operator or of early fatigue to the material are greatly reduced or eliminated.

Figure 3:
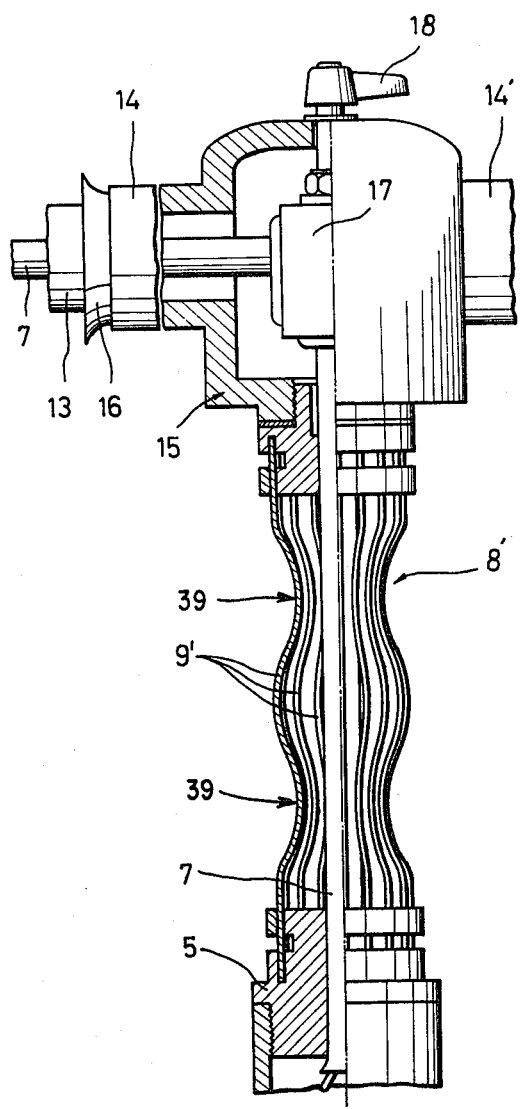
FIG. 3 is a front view of another embodiment of this invention, a part of which is shown in cross section.

FIG. 3 shows another embodiment of the present invention as used in a concrete vibrator of a different type. The vibration absorbing joint 8' comprises a plurality of bars 9' which has an additional ridge 39 as compared to the one making up the joint 8 of FIG. 2. The vibrator has a head 15 provided with a bar handle 14, 14' for holding the machine. To one end of the handle 14 is connected a flexible hose 13 via a protecting sheath 16, and the cable 17 reaches the machine body from out of the said vibration absorbing joint 8' via a triple-pole switch 17 in the head 15. In this embodiment, the operator holds the bar handle 14, 14' and starts the vibrator as he manipulates the knob 18 of the switch 17. Continuous vibration from the machine body does not reach the head 15 as it is sufficiently absorbed by the vibration absorbing joint 8'. Thus, neither the operator holding the handle 14, 14' nor the flexible hose 13 are subjected to any strong vibrations nor to any early fatigue.

As has been explained in detail, the present invention provides a vibration absorbing joint in the form of a cylindrical basket comprised of a plurality of bars to efficiently absorb continuous violent vibrations from the machine body of the portable vibrator; to prevent elastic failure of the flexible hose or the yieldable rubber connected to the machine body; and to attenuate the vibration to which the operator is subjected, thereby protecting his health. Thus, the invention clearly is of a high utility value while not complicating the construction.

What we claim is:
1. A vibration absorbing device comprising:
   a machine body incorporating a source of rotational vibration;
   a handle for holding the machine while in use; and
   a vibration absorbing joint coupling said machine body to said handle, said joint comprising a plurality of elastic bars (9) arranged about and spaced from an axis, said bars being spaced from each other and forming a generally cylindrical bird cage-like basket around said axis, said bars having a wavy or corrugated shape along the lengths thereof and defining at least one ridge (29;39) on a plane which includes the radial and axial directions of said cylindrical basket, said bars having their ridges in radial directions and being fixed at opposite ends of said cylindrical basket to said machine body and to said handle, respectively.

2. The vibration absorbing device of claim 1 wherein said cylindrical basket comprises ring members at both ends thereof connected respectively to said machine body and to said handle, both ends of said bars being fixed respectively to each of the two ring members; said ring members having inner bores for receiving a hose therethrough and said cylindrical basket forming a through hole for said hose to pass therethrough.

3. The vibration absorbing device of claim 1 wherein said cylindrical basket comprises ring members at both ends thereof connected respectively to said machine body and to said handle, said bars extending between said ring members and being fixed at the ends thereof to said ring members, said ring members having inner bores communicating with the central space defined by said cylindrical basket.

4. The vibration absorbing device of claim 1 wherein said elastic bars of said vibration absorbing joint define two separate ridges along the length of said bars, said ridges being generally directed in the radial direction of said cylindrical basket.

5. The vibration absorbing devices of claim 1 wherein said elastic bars are elongated bars having a generally round cross-section.

* * * * *